Oct. 28, 1924.                                                    1,513,460
F. J. JOHNSON
COFFEE MEASURING CONTAINER
Filed April 3, 1924
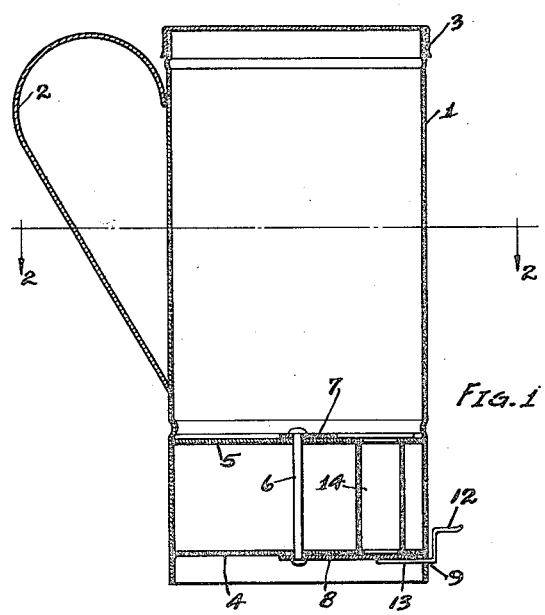
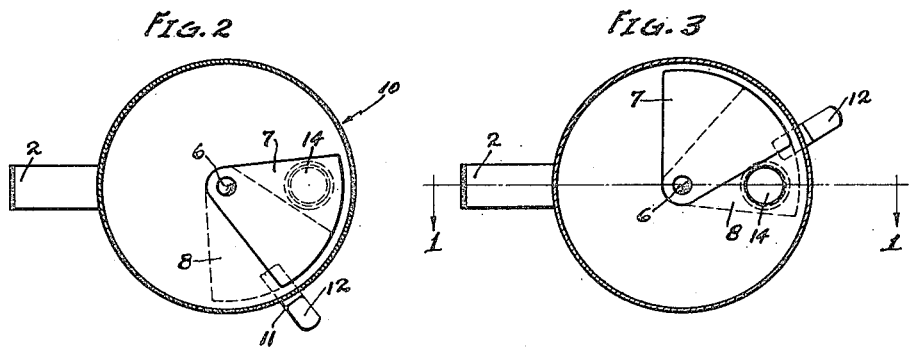
Inventor
FRED J JOHNSON
By C. F. Enochs
Attorney Patented Oct. 28, 1924.

1,513,460

UNITED STATES PATENT OFFICE.

FRED J. JOHNSON, OF MINNEAPOLIS, MINNESOTA.

COFFEE-MEASURING CONTAINER.

Application filed April 3, 1924. Serial No. 703,938.

*To all whom it may concern:*

Be it known that I, FRED J. JOHNSON, a citizen of the United States, and a resident of Minneapolis, in the county of Hennepin and State of Minnesota, have invented certain new and useful Improvements in Coffee-Measuring Containers, of which the following is a specification.

One object of my invention is to provide a container for coffee and the like that has incorporated as a part thereof means for measuring the contents as delivered from the container.

Another object is to provide improved means for actuating a measuring device forming part of a container.

With these and incidental objects in view, the invention consists of certain novel features of construction and combination of parts, the essential elements of which are hereinafter described with reference to the drawing which accompanies and forms a part of this specification.

In the drawing, Figure 1 is a vertical section of my improved coffee container taken through the center of the container; Figure 2 is a section taken on the line 2—2, Figure 1, with the measuring device in the position for discharging coffee and the like from the container; Figure 3 is a view similar to that shown in Figure 2, but with the measuring device positioned so that the measuring chamber is being filled from the body of the container and with the lower end of the measuring chamber closed.

The container body 1 has a suitable handle 2 attached thereto and a removable cap or cover 3 which preferably fits the body tightly so as to retain all of the strength of the coffee placed in the container.

The bottom of the container 4 is positioned slightly above the bottom edge of the body 1, and there is a false bottom 5 spaced above the bottom 4.

Journaled in these two bottom plates is a hinge pin 6 to which is ridgedly attached at its upper end the closure 7 and at its bottom end a closure 8 angularly offset from the closure 7 as shown in Figures 2 and 3.

Just below the bottom plate 4 a slot 9 extends from point 10 to point 11 (see Figure 2) in the body and the actuating lip 12 has its arm 13 passing through this slot and ridgedly fastened to the closure 8.

The measuring chamber 14 extends between the two plates and opens into the upper portion of the body 1 at the top and to the exterior of the container through the bottom 4.

It is evident from the construction shown and described that when the lip 12 is turned to the position shown in Figure 3 the measuring chamber 14 will be filled with coffee or whatever is contained in the body 1, and that when this lip is turned to the position shown in Figure 2 the top opening of the measuring chamber 14 will first be closed and then the bottom opening uncovered, thus emptying from the bottom of the container the coffee or other substance that has been contained in the measuring chamber 14.

The container is particularly adapted to coffee because a pound of coffee may be emptied into the body of the container, the cap 3 pushed tightly on, and the container is practically hermetically sealed, so the coffee does not lose any of its strength or flavor, while it is in the container.

While I have described my invention and illustrated it in one particular design, I do not wish it to be understood that I limit myself to this construction as it is evident the application of the invention may be varied in many ways within the scope of the following claim.

Claim:

In a measuring container the combination with a cylindrical body having a slot extending circumferentially in the body wall and near the bottom thereof, of a cap for closing the top of said body, a bottom positioned slightly above the slot in said body, a false bottom positioned above said first named bottom, a hinge pin journaled in said bottoms, a measuring chamber positioned between said bottoms and communicating with the body portion of the container above said false bottom and with the exterior of the container through said first named bottom, two closures ridgedly carried by said hinge pin and angularly disposed with reference to each other, one of said closures being positioned above said false bottom and the other positioned below said first named bottom, and an actuating lip on the exterior of said container having an arm passing through the slot in said container wall and ridgedly fastened to said bottom closure.

FRED J. JOHNSON.